Patented Nov. 26, 1935

2,022,462

UNITED STATES PATENT OFFICE 2,022,462

ART AND PRODUCTS OF RUBBER MANUFACTURE

Harvey J. Elwell, Newton, Mass., assignor to Vultex Corporation of America, Cambridge, Mass., a corporation of Massachusetts No Drawing. Application September 23, 1932, Serial No. 634,568

9 Claims. (Cl. 18—54)

This invention relates to the art of rubber manufacture, particularly the production of rubber goods from latex which has been vulcanized in suspension by combination with a vulcanizing agent or agents. It is applicable to the production of a wide variety of rubber articles, such as sheet rubber, gloves, nipples, footwear, thread, tubing, etc.; in fact, practically all articles capable of being molded by deposition of rubber from an aqueous suspension on the surface (external or internal) of a form or mold of any character, or of being made by extrusion.

The invention consists in my discovery hereinafter recited, and in the commercial application of this discovery for the production of rubber goods. Its object and accomplishment is to provide such goods in a state of greater purity and freedom from substances liable to cause deterioration with age than rubber goods heretofore produced, and to make them more economically in terms of time expenditure and investment of money in apparatus and other equipment. My discovery above referred to is that rubber latex, which has been vulcanized in suspension, when concentrated by mechanical action without chemical reaction with extraction of nonrubber ingredients of the suspension, becomes so unstable in the presence of heat that the rubber content of the dispersion is coagulable by heat alone above a temperature of approximately 100° F., and that in general, and within limits, the higher the temperature, the quicker is the coagulation.

In saying that the rubber is coagulable by heat alone, I mean that the dispersed particles of rubber are caused by heat to coalesce at the point or points of heat application and to cohere in an irreversible condition in the continuous phase of the dispersion and without the aid of any coagulating substance. That is, drying is not a factor of the coagulation, but the heat-coagulated rubber is as definitely nonredispersible while remaining in the serum as it is after having been withdrawn and dried.

The mechanical treatment thus far used, in the practice of my invention, for effecting concentration of vulcanized latex preparatory to the heat treatment, is the application of centrifugal force by means of a centrifuge whereby the fractions of different gravities in the vulcanized latex are substantially separated from one another, with removal not only of water soluble impurities, but also of solid ingredients in suspension. The coagulum resulting from the heat treatment step of this invention is essentially pure vulcanized rubber, of neutral reaction, containing substantially no excess of vulcanizing agents; and after drying it has exceptional strength, toughness, elasticity and freedom from deterioration even after long life and exposure to the air.

The preferred procedure using vulcanized latex is the following. Latex vulcanized according to either of the Schidrowitz patents, No. 1,443,149 dated January 23, 1923, and No. 1,682,857, dated September 4, 1928, commercially known as Vultex, which in the normal state contains about 38% rubber, is centrifuged to a concentration of about 60% rubber. This operation may be performed by a De Laval separator, or other suitable machine. The concentrate from this treatment is then diluted with water to approximately its original concentration of rubber and again centrifuged; and is preferably again diluted with water and centrifuged a third time. The final centrifuging may be continued until the concentrate is of a pasty consistency, but I prefer to limit the concentration to a rubber solid content between 50% and 65%; which is of freely fluid consistency approximating that of cream.

The effect of the repeated centrifuging and intermediate dilution or washing steps is to remove a large proportion, if not all, of the protective or stabilizing constituents of the original latex, such as proteins, resins and water solubles, as well as the uncombined excess of vulcanizing ingredients introduced in order to ensure vulcanization of substantially all the rubber. Many ingredients are thus eliminated which cannot be removed by filtration. In general it may be said that the greater the number of washing and centrifuging steps, the more nearly complete will be the elimination of such protective or stabilizing substances, and uncombined vulcanizing agents; but for practical commercial purposes three centrifuging and two washing steps are sufficient. The removal of these protective ingredients makes the concentrate coagulable by heat at a temperature of approximately 100° F., and higher temperatures.

The above described treatment of vulcanized latex is not original with me but is the invention of Henry B. Townsend, disclosed in Letters Patent of the United States No. 1,939,635 of the said Henry B. Townsend, granted December 12, 1933, to Vultex Corporation of America. Therefore I make no claim for said process in itself, but I do assert original discovery and invention of coagulating by heat alone the vulcanized latex concentrated and purified by that treatment, as well as by any other equivalent treatment, and the combination of that specific mode of treatment with my new step of heat coagulation, as a new combination process; together with all the useful products thereof.

It will be understood from the foregoing explanation that the invention is not necessarily limited to a specific number of repetitions of the centrifuging step, or even to centrifuging as distinguished from other feasible means of obtaining a vulcanized latex concentration substantially free from stabilizing constituents; provided the purified concentrate is coagulable by heat in the absence of chemical aids to coagulation, as explained in this specification.

The purified concentrate above described is substantially stable at low temperatures. At high temperatures, i. e., approximately 100° F. and above, it becomes unstable and rapidly coagulates. Hollow rubber articles of any desired shapes may be obtained by dipping heated forms of the prescribed shapes (i. e., forms for gloves, shoes, nipples, etc.) into the purified vulcanized latex concentrate and allowing them to remain long enough for deposit of a coagulated film of the desired thickness. I have found in practice that a dip of two minutes' duration of a heated form in vulcanized latex of the character hereinbefore described (the form being hollow and heated by circulating hot water of which the temperature on entering the form is 200° F., and on leaving it is 160° F.) suffices for deposit of a coagulated film which, after drying, has a thickness of about ten thousandths of an inch. The rubber dispersed in the liquid solidifies instantly upon contact with the heated form; and the film of solid rubber increases in thickness as fast as the heat is conducted from the form through the rubber already deposited. Films of greater thickness are obtainable by lengthening the time of immersion or by repeatedly dipping the form after drying the deposit of film. The rubber after drying is tough, elastic and durable, translucent or semi-transparent to an unusual degree, not readily susceptible to water spotting. Its condition of purity renders it immune from the rapid aging and deterioration caused by impurities, or by an excess of sulphur or other vulcanizing component, as well as unusually resistant to the oxidizing effect of the atmosphere.

The molds or forms used are such as do not react with or absorb the rubber, such as glass, porcelain, metal, etc., and preferably have a smooth, polished or glazed surface. They may be heated by other agents than hot water, as steam, hot air, electrical heating elements, etc. In general, the higher the temperature at which the mold is maintained, (of course below a degree which would injure the rubber), the more rapid is the coagulation and deposition of solid rubber. The film may be dried by exposure to atmospheric air at ordinary temperatures, or more rapidly by a current or circulation of artificially heated air.

Sheet rubber is produced by dipping heated forms, such as plates, having extended flat surfaces, in the vulcanized latex concentrate, removing them and drying the films. Preferably, however, rubber of this character is made in a continuous operation by passing an endless belt over a body of concentrated vulcanized latex in contact with the surface thereof, heating the belt, regulating its rate of movement so as to give time for deposit of a film of desired thickness, drying the film after emergence from the vat in which the vulcanized latex is contained, and stripping the dried film from the belt. Or a hollow steam heated drum mounted with its circumference at one side dipping into a body of the vulcanized latex may be operated in substantially the same way for the same purpose. Such a belt may be of any length and arranged to pass around supporting pulleys at any desired distance apart with its lower stretch in contact with the body of vulcanized latex as described. An electric heater, or a heating radiator of any other character placed adjacent to or in contact with the part of the belt which thus contacts with the vulcanized latex will suffice to provide the necessary heat.

Rubber thread also is made according to this process by extruding the purified vulcanized latex through suitably formed dies. Coagulation in that case may be effected either by heating the die only, or by applying heat to the stream of vulcanized latex just after emergence from the die, or both before and after emergence. The preferred process is to arrange the die with its discharge orifice projecting into a water bath heated to a temperature above the temperature of coagulation, but far enough below the boiling point to prevent injury by turbulence of the water to the newly formed thread which, before drying is soft and weak. That is, the water is kept as near as possible to the degree at which it commences to be turbulent. The stream emerging from the die is instantly coagulated on the surface, which prevents its dispersion into the water of the bath. As the stream continues its progress through the bath, it is rapidly permeated by heat until soon all of its contained rubber is coagulated to a solid thread. In being dried after coagulation, the thread suffers a shrinkage proportional to the content of water in the vulcanized latex concentrate, becoming smaller in cross section and being substantially smooth on its surface, but exhibiting effects due to shrinkage. Its cross sectional outline is generally similar to the extrusion orifice; but lacks sharp corners even when extruded from a rectangular or triangular orifice. It is characteristically different in this particular, and also in the absence of transverse knife marks and all corner tears from cut rubber thread.

Coagulation may be effected in the die by heating the latter to a temperature and distance back from the outlet orifice sufficient for the purpose, and the coagulated thread discharged into a water bath to carry it away by flotation and avoid breakage and attenuation. However, I prefer to coagulate after emergence since the extruding pressure is lower in that case; a pressure of from one to three pounds per square inch being sufficient whereas a considerably higher pressure is necessary to expel a solid thread coagulated in the die. The pressure for propelling the liquid may be applied by either a static head, compressed air acting on a body of the liquid, or a nonpulsating pump.

Highly satisfactory results are obtained from this process when the water receiving the thread is neutral, i. e., neither acid nor alkaline. However, the result is not adversely affected if the water is slightly acid or slightly alkaline, provided its acidity is so mild that it will not satisfactorily coagulate normal latex. But I prefer that the water should not be acid in any degree, since the least acidity requires subsequent neutralization of the thread. Hence in practice I use water which has been made slightly alkaline to assure against acidity. In other words, the water has a pH value greater than 7. Lime is preferred, on account of its permanent retention in the water, to some other of the alkalies which might be used for this purpose.

The thread extruded into water rises and floats on the surface. It is taken from the water by a traveling conveyor on which it rests under virtually no tension, and is dried by hot air, or otherwise suitably. Upon drying, it acquires the same characteristics, previously described, as other rubber manufactures made of the same latex preparations.

Threads so made may be of any cross section, i. e., round, polygonal, elliptical, flat, or any other form capable of being imparted by the outline of an orifice. Within the meaning of the term "thread" as here used I include ribbon-like strands as well as all other forms, of whatever sizes and dimensions, capable of being extruded in this way. Seamless tubing of any form may be made by the same methods of extrusion with the use of suitable dies having interior cores, analogous to those used in the extrusion method of making tubes of other material than rubber.

Other rubber articles than those within the categories hereinbefore indicated may be made by filling molds composed of separable parts with purified vulcanized latex, heating the molds for a period long enough to cause coagulation, opening the molds, and removing and drying the contained article. For the purpose of generic definition in this case, all of the modes described herein of forming rubber goods, i. e., by the external surfaces of forms of all sorts, the interior of hollow or recessed molds, by dies through which the material is shaped in flowing, etc. are considered to be actions of molding.

The foregoing description and the following claims are not to be construed as limiting the invention in any such manner as to preclude the addition to the vulcanized latex concentrate of desirable ingredients such as substances or compounds to give desired color effects, to secure protection against the destructive effects of sunlight and chafing, etc., or to absorb oxygen in the air so as to delay oxidizing of the resulting products when exposed to the atmosphere. It is to be understood that I may use all such compounds and substances as are already known, or may be hereafter discovered, to be suitable for the purposes indicated, which substances may be added to the concentrated vulcanized latex; and that the recital in the appended claims of freedom from nonrubber ingredients of natural latex is to be construed in accordance with this explanation.

The principles of this invention, and some of the uses thereof hereinbefore described, were originally disclosed in my prior application filed April 23, 1931, Serial No. 532,281, of which prior application the present is a continuation as to all common subject matter.

What I claim is:

1. The method of making rubber articles which consists in molding or forming vulcanized rubber latex which has been purified and concentrated by mechanical separation of most of the vulcanized rubber particles from a part of the serum and from a high proportion of the nonrubber constituents carried by the serum, which comprises depositing a coagulum of rubber from such concentrate by cooperation of forming means and heat at a temperature of 100° F. or higher and without either adding a rubber coagulant to the concentrate or substantially evaporating the water in the serum.

2. The method of making vulcanized rubber filaments, tubing and the like which consists in extruding vulcanized latex concentrate, substantially free of protective colloids, proteins and water-soluble constituents, through a die and coagulating the rubber content in the material thus extruded, by application of heat alone at a temperature of 100° F. or higher.

3. The method of making vulcanized rubber thread, tubing and the like which comprises extruding purified and concentrated vulcanized rubber latex into hot water at a temperature over 100° F. and free from acid, thereby coagulating the extruded rubber into a continuous body having substantially the cross sectional form given by the orifice from which it is extruded.

4. The method of making vulcanized rubber thread, tubing and the like which comprises extruding purified and concentrated vulcanized rubber latex into nonturbulent water which has a temperature of over 100° F. and which has a pH value greater than 7.0, thereby coagulating the rubber into a continuous body having substantially the cross sectional form given by the orifice from which it is extruded.

5. The method of making vulcanized rubber thread, tubing and the like which comprises extruding vulcanized rubber latex, which has been concentrated and purified by mechanical centrifugal action to a concentration of above 50% content of solid matter, while retaining sufficient liquid in the concentrate to hold the rubber in suspension, into water which has a temperature of over 100° F. but below the temperature at which ebullition occurs, and is free from acid, thereby coagulating the rubber into a continuous body having substantially the cross sectional form given by the orifice from which it is extruded.

6. The method of making vulcanized rubber thread which consists in taking the concentrated residue of vulcanized rubber latex which has been concentrated and purified by repeated steps of centrifuging and intermediate steps of dilution with water, and extruding the concentrated matter through an orifice submerged in a bath of hot water, the temperature of which is above 100° F. and below the point at which turbulence begins, whereby the rubber content of the extruded stream is coagulated, removing the coagulated thread from the bath and drying it.

7. The method of making rubber articles which consists in molding or forming vulcanized rubber latex, which has been purified and concentrated by mechanical separation of most of the vulcanized rubber particles from a part of the serum and from a high proportion of the non-rubber constituents carried by the serum by repeated steps of centrifuging and intermediate dilution with water, which comprises depositing a coagulum of rubber from such concentrate by cooperation of forming means and heat at a temperature of 100° F. or higher and without either adding a rubber coagulant to the concentrate or substantially evaporating the water in the serum.

8. The method of making rubber articles which consists in molding or forming vulcanized rubber latex, which has been purified and concentrated by mechanical separation of most of the vulcanized rubber particles from a part of the serum and from a high proportion of the non-rubber constituents carried by the serum, which comprises depositing a coagulum of rubber from such concentrate by cooperation of forming means and heat at a temperature of 100° F. or higher, progressively increasing the thickness of the coagulum by continuing such heat application without either adding a rubber coagulant to the concentrate or substantially evaporating the water in the serum.

9. The method of making vulcanized rubber thread, tubing and like products which comprises extruding vulcanized rubber latex, which has been concentrated and purified to remove a high proportion of the non-rubber constituents, through an orifice to a medium which both supports and heats the product, thereby coagulating the extruded rubber into a continuous body by heat alone at a temperature of 100° F. or higher.

HARVEY J. ELWELL.